(12) United States Patent
Ishii

(10) Patent No.: US 8,483,543 B2
(45) Date of Patent: Jul. 9, 2013

(54) RECORDING AND REPRODUCING APPARATUS USING RANDOM ACCESS RECORDING MEDIUM

(75) Inventor: Yoshiki Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1960 days.

(21) Appl. No.: 10/537,351

(22) PCT Filed: May 28, 2004

(86) PCT No.: PCT/JP2004/007786
§ 371 (c)(1),
(2), (4) Date: Jun. 6, 2005

(87) PCT Pub. No.: WO2004/112033
PCT Pub. Date: Dec. 23, 2004

(65) Prior Publication Data
US 2006/0187318 A1  Aug. 24, 2006

(30) Foreign Application Priority Data

Jun. 10, 2003 (JP) .................. 2003-165088

(51) Int. Cl.
*H04N 5/76* (2006.01)
*H04N 5/765* (2006.01)
*H04N 5/92* (2006.01)
*H04N 5/93* (2006.01)

(52) U.S. Cl.
USPC .................... 386/232; 386/239; 386/278

(58) Field of Classification Search
None
See application file for complete search history.

(56) References Cited

U.S. PATENT DOCUMENTS

| 6,473,096 | B1 | 10/2002 | Kobayashi et al. | 345/731 |
|---|---|---|---|---|
| 6,529,948 | B1 * | 3/2003 | Bowman-Amuah | 709/217 |
| 7,246,127 | B2 * | 7/2007 | Murakami et al. | 707/100 |
| 2003/0146915 | A1 | 8/2003 | Brook et al. | 345/473 |
| 2004/0083273 | A1 * | 4/2004 | Madison et al. | 709/217 |
| 2005/0226603 | A1 | 10/2005 | Hirabayashi et al. | 386/95 |
| 2005/0281535 | A1 * | 12/2005 | Fu et al. | 386/69 |

FOREIGN PATENT DOCUMENTS

| EP | 1 372 087 A1 | 12/2003 |
|---|---|---|
| EP | 1 418 508 A1 | 5/2004 |
| EP | 1 441 356 A2 | 7/2004 |
| JP | 2000-187542 | 7/2000 |
| JP | 2002-175680 | 6/2002 |
| JP | 2003-059236 | 2/2003 |
| WO | WO 02/077865 A1 | 10/2002 |
| WO | WO 02077865 A1 * | 10/2002 |
| WO | WO 03/030029 A1 | 4/2003 |

OTHER PUBLICATIONS

Oct. 11, 2004 International Search Report in PCT/JP2004/007786.
Oct. 11, 2004 Written Opinion in PCT/JP2004/007786.

* cited by examiner

*Primary Examiner* — William C Vaughn, Jr.
*Assistant Examiner* — Heather Jones
(74) *Attorney, Agent, or Firm* — Fitzpatrick, Cella, Harper & Scinto

(57) ABSTRACT

A recording and reproducing apparatus is configured so as to record moving image data in which AV data contents recorded on a disk-shaped recording medium are referred to one by one by first reference type data which can attain time synchronization between the contents, and further to record a play list in which one or the plurality of the first reference type data and one or the plurality of AV data contents are referred to by second reference type data which can attain time synchronization between the contents.

9 Claims, 8 Drawing Sheets

FIG. 7

```
<smil>
 <head>
    ----
 </head>
 <body>
  <video src= "scene1.mov" />
  <video src= "scene2.mov" />
  <video src= "scene3.mov" />
 </body>
</smil>
```

RECORDING AND REPRODUCING APPARATUS USING RANDOM ACCESS RECORDING MEDIUM

TECHNICAL FIELD

The present invention relates to a recording and reproducing apparatus, particularly to an image recording and reproducing apparatus using a random access recording medium such as a disk.

BACKGROUND ART

Currently, as a recording medium, a camera integral-type recording and reproducing apparatus (hereinafter referred to as a video camera) adopting a disk-shaped recording medium (hereinafter referred to as a disk), such as a semiconductor memory card and DVD (Digital Versatile Disk), comes into the market. Such video cameras are manufactured featuring random access characteristics of the recording medium which magnetic tape cannot attain.

For example, the above-described video camera forms each file of a moving image, a still image and an audio concerning a taken scene and records the files in the disk or the like. The video camera directly can access to each file during reproduction to attain the easy and high-speed reproducing operation.

In the video camera using the disk as the recording medium, usually the scenes obtained during a period from recording start to recording stop are compressed and encoded in one video clip and converted into one file to be stored on the disk. Therefore, the disk stores the plurality of video clip files. Usually the video camera can reproduce all the recorded scenes by continuously reading out the plurality of video clip files on the disk. With reference to another reproducing mode, play list-reproducing function in which a user arbitrarily designates the video clip files to be reproduced and a sequence of the video clip files to perform simple editing has been also realized. For example, Japanese Patent Application Laid-Open No. 2002-175680 is already known as the prior art in which the play list reproduction is performed in the video camera.

The configuration of the above-described video camera will be reviewed. FIG. 8 is a view showing the configuration of a picture taking and recording system of a video camera 800 using the disk. The reference numeral 801 denotes a camera optical system which takes an object with proper focal distance and exposure by controlling driving systems such as a focus and an iris with a camera controller 805. The reference numeral 802 denotes an image pickup device which converts incident light into an electric signal by a CCD sensor or a CMOS sensor. The reference numeral 803 denotes a camera signal processing circuit which generates digital video data of a color video image after analog-to-digital conversion of the electric signal from the image pickup device. The reference numeral 804 denotes a video encoding circuit which compresses and encodes the digital video data. The reference numeral 807 denotes a file generation circuit which generates a video clip file including the compressed digital video data. The reference numeral 808 denotes an error correction coding circuit which adds parity data for performing error correction of the video clip file. The reference numeral 809 denotes a data modulation circuit which performs modulation coding such as a (1,7) RLL code and a trellis code in order to record the video clip file on the recording medium. The reference numeral 810 denotes a magnetic field modulation driver which drives a magnetic head 811 according to an input signal to apply a magnetic field onto a disk-shaped recording medium 813. The reference numeral 812 denotes an optical pickup which irradiates the recording medium 813 with a recording laser beam according to the input signal. The generated video clip file is recorded on the recording medium 813. A drive controller 816 controls operations of the optical pickup 812 and a motor 814 to perform drive control by outputting a control signal to a drive servo circuit 815 on a request from a system controller 817. Up to this point, the video camera using the disk shown in FIG. 8 is described.

However, in the conventional recording and reproducing apparatus such as the video camera using the disk, division or partial deletion of the video clip file itself recorded in a stream format is performed, in the case where clip editing, such as the division or the partial deletion of video clip which is of the moving image data file, is performed. Therefore, it is inconvenient because the clip editing provides no reversibility to the clip after the editing. Further, since rewriting of the stream data itself is required for after-recording editing of audio, there are various problems such as long processing time. With reference to the play list reproducing function included in the conventional video cameras, the play list reproducing function is an extent of the so-called program reproduction, and the sophisticated editing such that the reproducing operation or synchronization is controlled, while a plurality of contents are dealt with cannot be attained, so that the play list reproducing function is unsatisfying.

DISCLOSURE OF THE INVENTION

An object of the present invention is to solve the above-described problems.

Another object of the invention is to provide the recording apparatus which can realize flexible editing function.

As a preferred embodiment for such objects, a recording apparatus of the present invention comprises first recording means for recording image data and first reference type data referring to said image data on a recording medium, and second recording means for recording one or a plurality of said image data and/or second reference type data referring to one or the plurality of said first reference type data.

Another recording apparatus of the present invention comprises a recording unit which records image data and first reference type data referring to said image data on a recording medium, and an editing unit which generates one or a plurality of said image data and/or second reference type data referring to one or the plurality of said first reference type data.

A recording method of the present invention comprises a first recording step of recording image data and first reference type data referring to said image data on a recording medium, and a second recording step of recording one or a plurality of said image data and/or second reference type data referring to one or the plurality of said first reference type data on said recording medium.

Still other objects of the present invention, and the advantages thereof, will become fully apparent from the following detailed description of the embodiments.

BRIEF DESCRIPTION OF THE DRAWINGS

FIG. 7 is a view showing an example of the configuration of a play list; and

BEST MODE FOR CARRYING OUT THE INVENTION

The preferred embodiments of the present invention will now be described in detail hereinafter with reference to the accompanying drawings.

Figure 1:
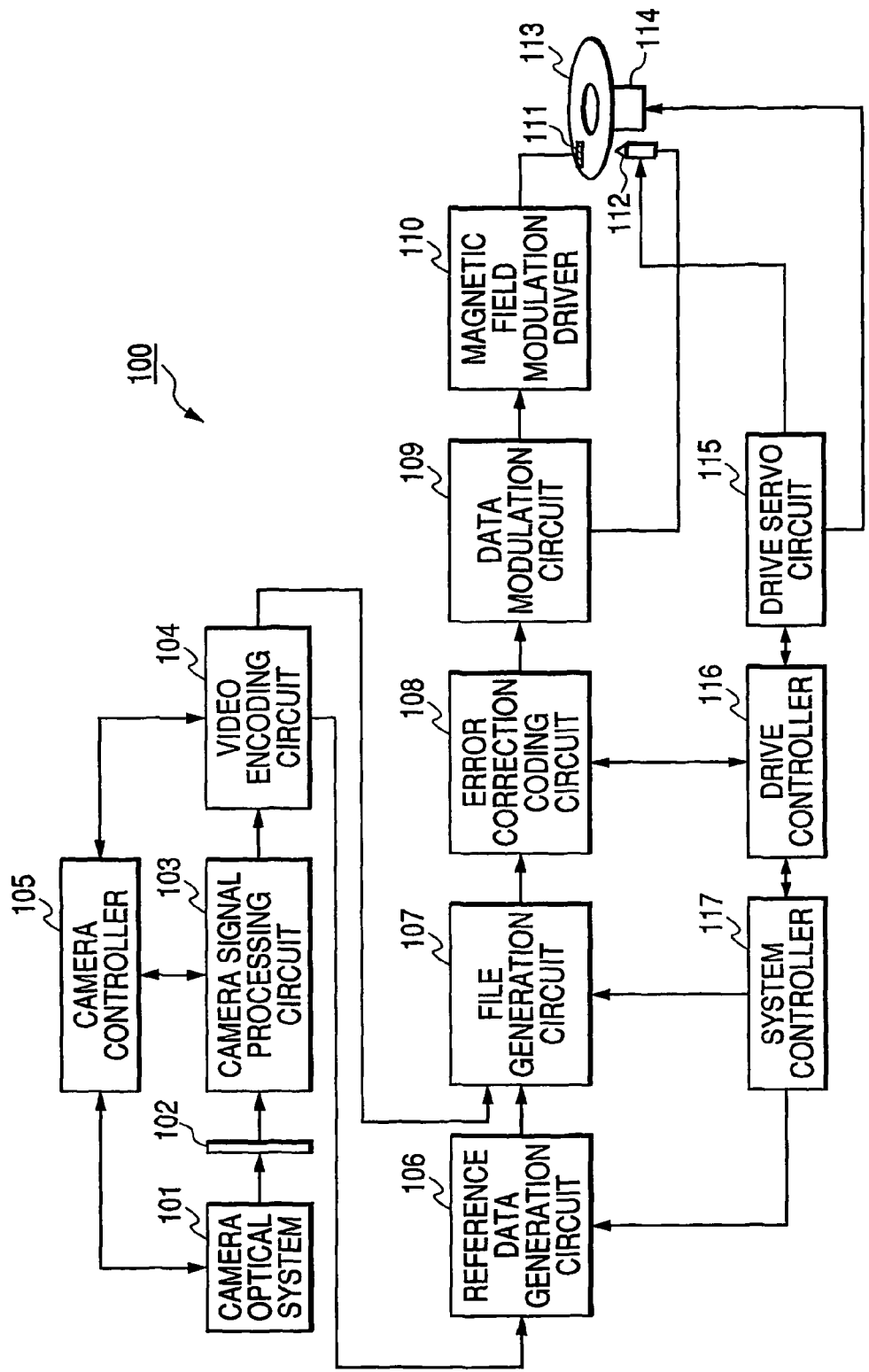
FIG. 1 is a view showing a configuration concerning picture taking and recording of a video camera apparatus which is of one embodiment of the recording and reproducing apparatus of the invention.

FIG. 1 shows the configuration concerning the picture taking and the recording of a camera integral-type image recording and reproducing apparatus 100 (hereinafter referred to as video camera apparatus 100) as an example of the recording and reproducing apparatus in which the disk-shaped recording medium (hereinafter referred to as disk) is mainly used as the recording medium. Although the video camera apparatus 100 can record both the video signal and the audio signal, in the following description of the embodiment, the description of the audio signal will be omitted and only the video signal will be described.

In FIG. 1, the reference numeral 101 denotes a camera optical system which captures an object with the proper focal distance and exposure by controlling driving systems such as a focus and an iris with a camera controller 105. The reference numeral 102 denotes an image pickup device which converts incident light into the electric signal by the CCD sensor or the CMOS sensor. The reference numeral 103 denotes a camera signal processing circuit which generates digital video data of the color video image after the analog-to-digital (A/D) conversion of the electric signal from the image pickup device 102. The reference numeral 104 denotes a video encoding circuit which compresses and encodes the digital video data by an MPEG (Moving Picture Experts Group)-2 format or the like. The reference numeral 107 denotes a file generation circuit which generates a data contents file including the digital video data compressed by MPEG-2 or the like. The reference numeral 108 denotes an error correction coding circuit which adds parity data for performing error correction of the data contents file. The reference numeral 109 denotes a data modulation circuit which performs modulation coding such as the (1,7) RLL code and the trellis code in order to record the data contents file on the recording medium. The reference numeral 110 denotes a magnetic field modulation driver which drives a magnetic head 111 according to the input signal to apply the magnetic field onto a disk-shaped recording medium 113. The reference numeral 112 denotes an optical pickup which irradiates the recording medium 113 with the recording laser beam according to the input signal. The generated data contents file is recorded on the recording medium 113. The data contents file is recorded according to the logical file format of the disk. The recording medium 113 is the disk-shaped recording medium and 113 includes DVD, Blu-ray, and the like.

A drive controller 116 performs drive control to control operations of the optical pickup 112 and a motor 114 by outputting the control signal to a drive servo circuit 115 on a request from a system controller 117. The system controller 117 is the control circuit including a microcomputer which controls operation of each unit in the apparatus such as a reference data generation circuit 106, the file generation circuit 107, and the error correction coding circuit 108.

In accordance with the control of the system controller 117, the reference data generation circuit 106 automatically generates the reference type moving image data referring to the data contents file recorded on the recording medium 113, in parallel with the picture taking and recording operation. The file generation circuit 107 generates a reference type moving image file on the basis of the generated reference type moving image data, and the reference type moving image file is recorded on the recording medium 113 as in the case of the above-described data contents file.

The reference type moving image data directly utilizes a data recording format in "QuickTime" (trademark) which is of the function of treating multi media and supplied by Apple Computer, Inc. in U.S. (hereinafter simply referred to as QuickTime), or utilizes expanded QuickTime. When QuickTime is used, AV data contents can be referred to one by one to attain time synchronization between data contents.

Figure 3:
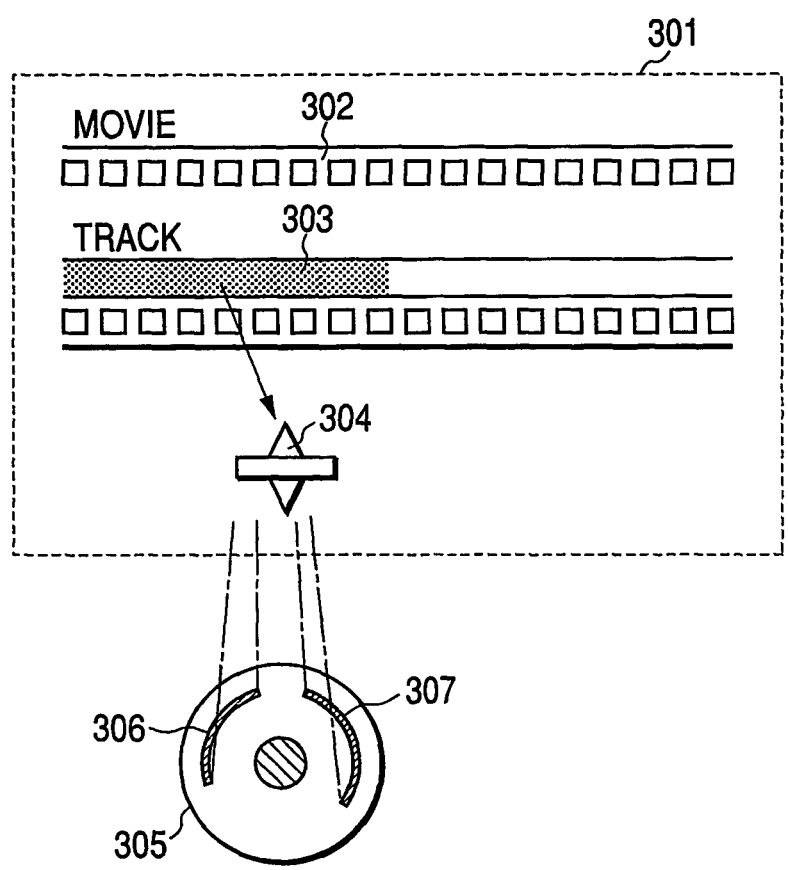
FIG. 3 is a view for explaining a schematic configuration of QuickTime movie.

FIG. 3 shows the configuration of the reference type moving image data described by QuickTime, which is generated by the reference data generation circuit 106. In FIG. 3, the reference numeral 301 shows a conceptual view of the configuration of the reference type moving image file by QuickTime. The reference numeral 302 is called "movie" and has a data structure in which video data referred to by the file 301 is managed on the basis of time. The movie 302 can have a plurality of "tracks," and each track corresponds to each video data actually reproduced. The reference numeral 303 denotes one track in the movie. In each track, data structures called "media" can be arranged in time series. The reference numeral 304 denotes a data structure of the media, and the media actually has reference information to video data contents 306 and 307 recorded on a recording medium 305. The information in which the reference type moving image data is filed by QuickTime like 301 is recorded on the recording medium 305.

Figure 4:
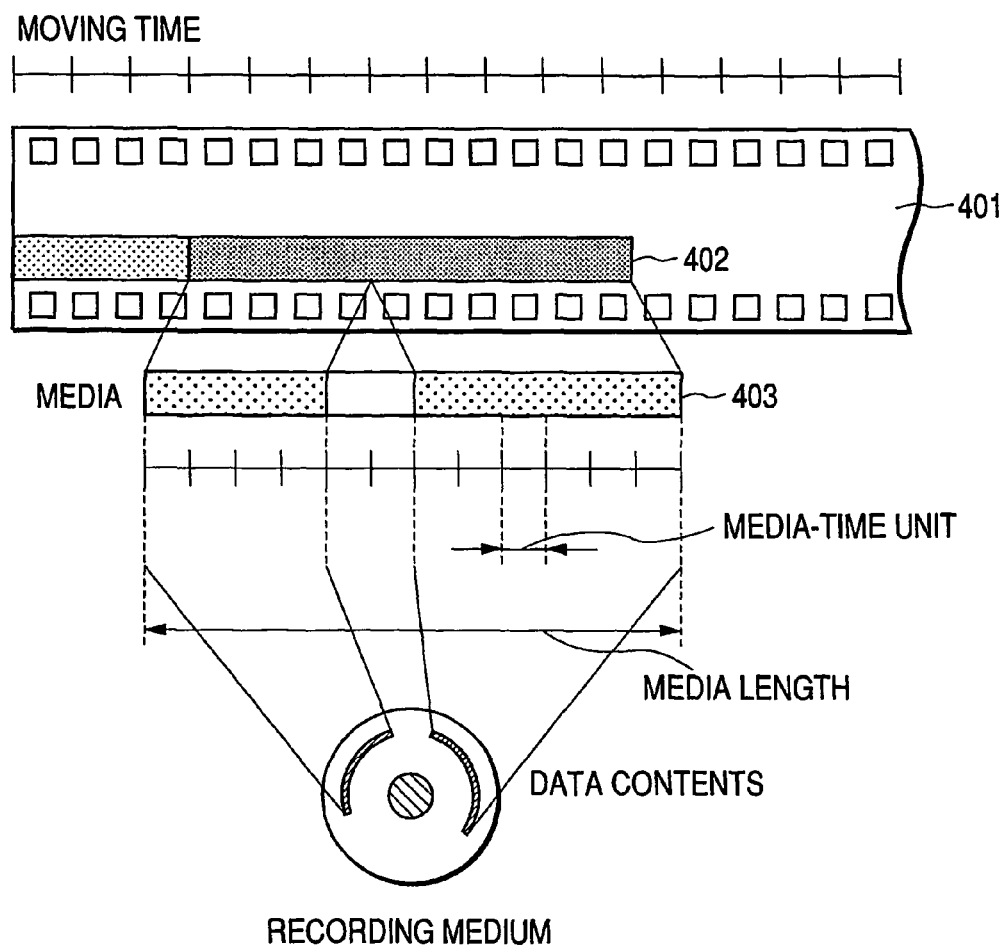
FIG. 4 is a view for explaining a time coordinate system of QuickTime movie.

The movie and the media can have an independent time coordinate system. The independent time coordinate system will be described referring to FIG. 4. In FIG. 4, although the movie denoted by the reference numeral 401 has a movie time coordinate (movie time) whose origin is located at a movie front end, media 403 stored on a track 402 has a media time coordinate (media time unit) independent of the movie time coordinate.

Since the recording and reproducing apparatus of the present embodiment is configured so that the data contents are managed in the reference form such as QuickTime during recording the movie, the desired editing can be realized without changing the actual video data by updating the reference type data, even if the editing operation such as the partial deletion, the division or the combination of the movie is performed. At this point, a part of the data contents, which is not referred to by the partial deletion, can be deleted from the recording medium. Up to this point, the video camera apparatus 100 shown in FIG. 1 is described.

Figure 2:
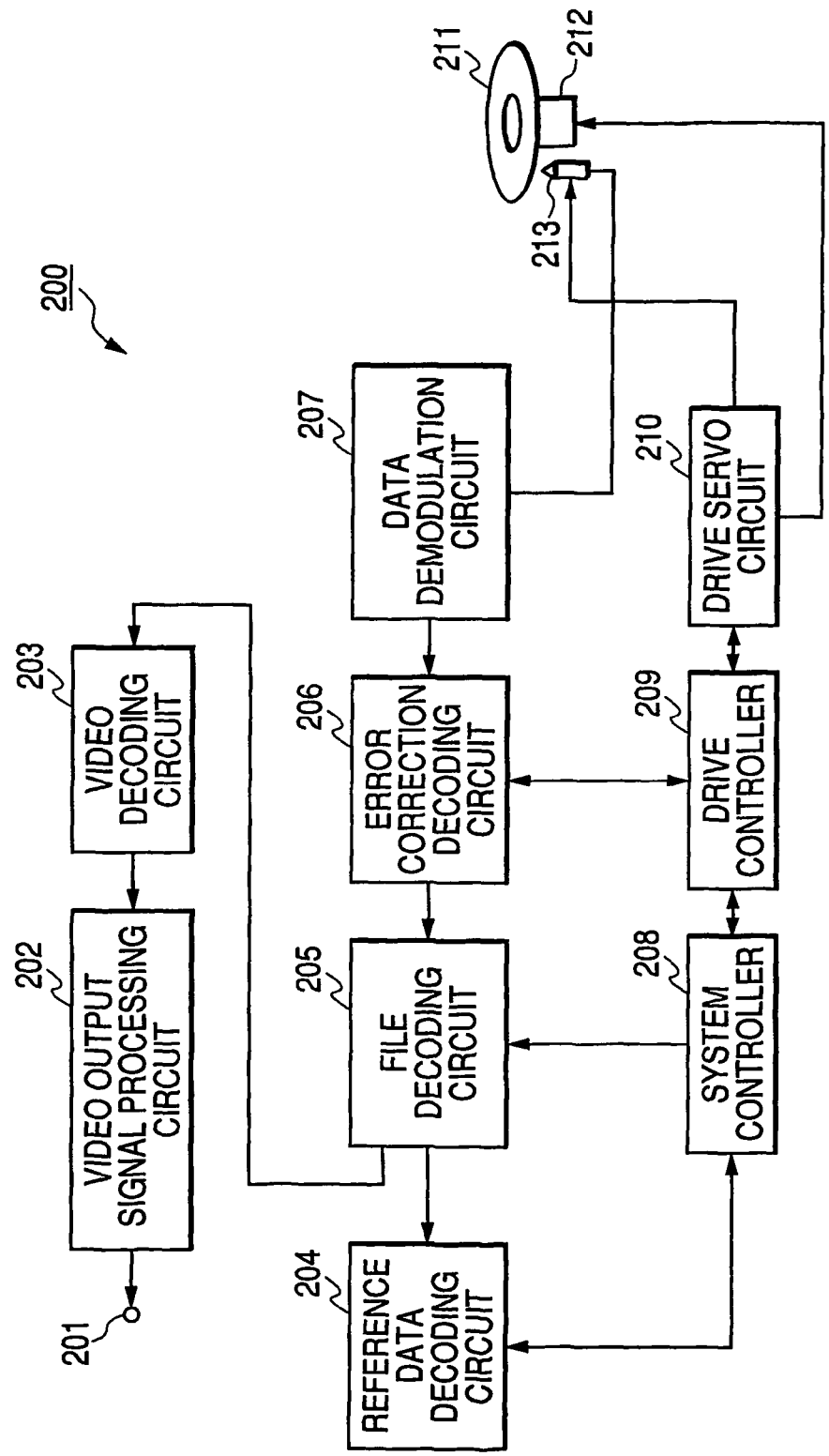
FIG. 2 is a view showing the configuration concerning reproduction of the video camera apparatus which is of one embodiment of the recording and reproducing apparatus of the invention.

FIG. 2 is the view showing the configuration concerning the reproduction of a video camera apparatus 200 which is of an example of the recording and reproducing apparatus in which the disk is mainly used as the recording medium. It is possible that the video camera apparatus 200 is integrated with the above-described video camera apparatus 100 on the product.

In FIG. 2, a drive controller 209 controls data readout operation of the overall drive by inputting the control signal to a drive servo circuit 210 on a request from a system controller 208 to control the drives of an optical pickup 213 and a motor 212. A recording medium 211 is the disk-shaped recording medium, and the recording medium 211 includes DVD, Blu-ray, and the like.

At first, the optical pickup 213 reads out management data recorded on the recording medium 211. On the data read out from the recording medium 211 by the optical pickup 213, demodulation processing is performed by a data demodulation circuit 207, and the error generated due to defect of the recording medium 211 or during the recording processing and reproducing processing is corrected by an error correction decoding circuit 206. A file decoding circuit 205 decodes a logical file format from a data string after the error correction.

In reproducing operation, the reference type moving image file recorded on the recording medium 211 is read out according to the logical file format. On the data read out, the demodulation processing is performed by the data demodulation circuit 207, and the error correction is performed by the error correction decoding circuit 206. Then, the data is decoded into the reference type moving image data by the file decoding circuit 205 and decoded into the reference information of QuickTime by a reference data decoding circuit 204.

When the moving image to be reproduced is selected according to user instruction or the like, the reference type moving image data to be reproduced is selected by a command from the system controller 208. On the basis of a reference relation included in the decoded reference information of QuickTime, the video data contents file to be actually reproduced is read out from the recording medium 211 by the command from the system controller 208. On the data read out, the demodulation processing is performed by the data demodulation circuit 207, and the error correction is performed by the error correction decoding circuit 206. Then, the data is decoded into the digital video data (MPEG-2 data) by the file decoding circuit 205, and expansion decoding processing of the data is performed according to the MPEG-2 format by a video' decoding circuit 203. The digital video data decoded by the video decoding circuit 203 is converted into the analog or digital video signal by a video output signal processing circuit 202 and output from a terminal 201 to a monitor (not shown), an external recording apparatus, or the like. Up to this point, the video camera apparatus 200 shown in FIG. 2 is described.

Figure 5:
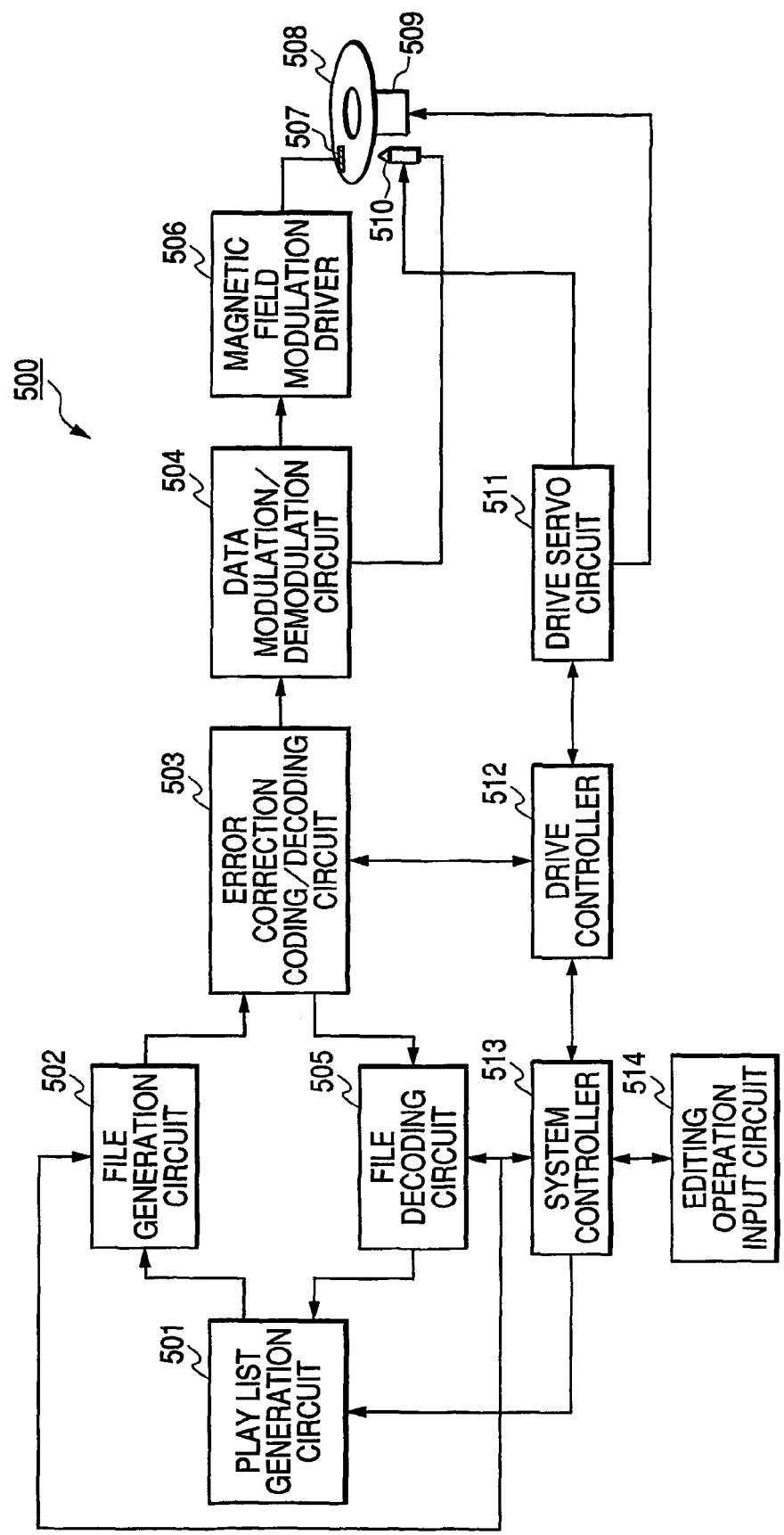
FIG. 5 is a view showing the configuration concerning play list editing of the video camera apparatus which is of one embodiment of the recording and reproducing apparatus of the invention.

FIG. 5 is the view showing the configuration of a video camera apparatus 500 which is of an example of the recording and reproducing apparatus in which the disk is mainly used as the recording medium, and FIG. 5 is the view for explaining the configuration of the editing of "play list" and the generation and the recording of a play list file. The play list is another reference type moving image data which is included in the video camera apparatus 500. It is possible that the video camera apparatus 500 is integrated with the above-described video camera apparatuses 100 and 200 on the product. The video camera apparatus 500 also has all the above-described functions and configurations.

In FIG. 5, the reference numeral 514 denotes an editing operation input circuit 514, and the editing operation input circuit 514 is a UI circuit including an operation unit to which the instruction of video editing is input by the user. The information necessary for the editing such as the management information and recording information is read out from a recording medium 508 in such a manner that a system controller 513 gives the request to a drive controller 512 according to the instruction of the user and controls the drives of an optical pickup 510 and a motor 509 with a drive servo circuit 511. A recording medium 508 is the disk-shaped recording medium, and the recording medium 508 includes DVD, Blu-ray, and the like.

On the data read out from the recording medium 508 by the optical pickup 510, the demodulation processing is performed by a data modulation/demodulation circuit 504, and the error generated due to the defect of the recording medium 508 or during the recording processing and reproducing processing is corrected by an error correction coding/decoding circuit 503. A file decoding circuit 505 decodes the logical file format from the data string after the error correction.

The reference type moving image file recorded on the recording medium 508 is read out according to the logical file format. On the data read out, the demodulation processing is performed by the data modulation/demodulation circuit 504, and the error correction is performed by the error correction coding/decoding circuit 503. Then, the data is decoded into the reference type moving image data of QuickTime by a file decoding circuit 505.

Thus, the system controller 513 generates play list data by providing the command to a play list generation circuit 501 on the basis of the information reproduced from the recording medium 508 in the manner described above while following the editing instruction input from the editing operation input circuit 514.

The play list data generated at this point is the data for forming the play list designating a reproducing mode of the data contents recorded on the recording medium 508. In the embodiment, the play list is also formed by the reference type moving image data, and the detail will be described later. The desired play list can be reproduced in such a manner that a kind, a range, order, effect, and the like of a scene which the user wants to reproduce are arbitrarily edited to generate the play list data on the basis of result of the editing.

The play list generation circuit 501 edits the reference type moving image data (QuickTime) and the video data contents to generate the play list data while referring to the reference type moving image data (QuickTime) decoded by the file decoding circuit 505 and the video data contents referred to by the reference type moving image data (QuickTime).

The play list file is generated by the file generation circuit 502 on the basis of the generated play list data. On the generated play list file, the coding for the error correction is performed by the error correction coding/decoding circuit 503, and data modulation is performed by the data modulation/demodulation circuit 504. Then, the play list file is output to the optical pickup 510, and the play list file is also output to a magnetic head 507 through a magnetic field modulation driver 506 to use the application of the magnetic field. Then, the play list file is recorded from the optical pickup 510 onto the recording medium 508 according to the control of the drive controller 512 and the control of the drive servo circuit 511.

The configuration of the play list in the embodiment will be described. As described above, the play list is formed by the reference type moving image data. For an example of the play list data generated by the play list generation circuit 501, reference type reproduction description data such as "QuickTime" or "SMIL" is used. In the following description of the embodiment, an example in which the play list is generated by directly utilizing SMIL or by utilizing the expansion of SMIL will be described. The play list can refer to various kinds of data contents such as video data contents, audio data contents, and still image data contents, which are recorded on the recording medium through a part or the whole of QuickTime (reference type moving image data generated in recording data contents).

According to the play list editing using the play list generation circuit 501, the further reference type play list data can be generated on the basis of the reference type moving image data by QuickTime (used in normal reproduction), so that the editing result can be obtained without performing the division, the combination, the partial deletion, and the like of the actual data contents so that the division, the combination, the partial deletion, and the like of the actual data contents are performed to reproduce the play list in a pseudo manner.

FIG. 7 is the view showing an example of the play list data generated by the play list generation circuit 501 in the simplified SMIL description. In the example of FIG. 7, "scene1.mov," "scene2.mov," and "scene3.mov" are described so as to be sequentially reproduced. Up to this point, the video camera apparatus 500 of FIG. 5 is described.

Figure 6:
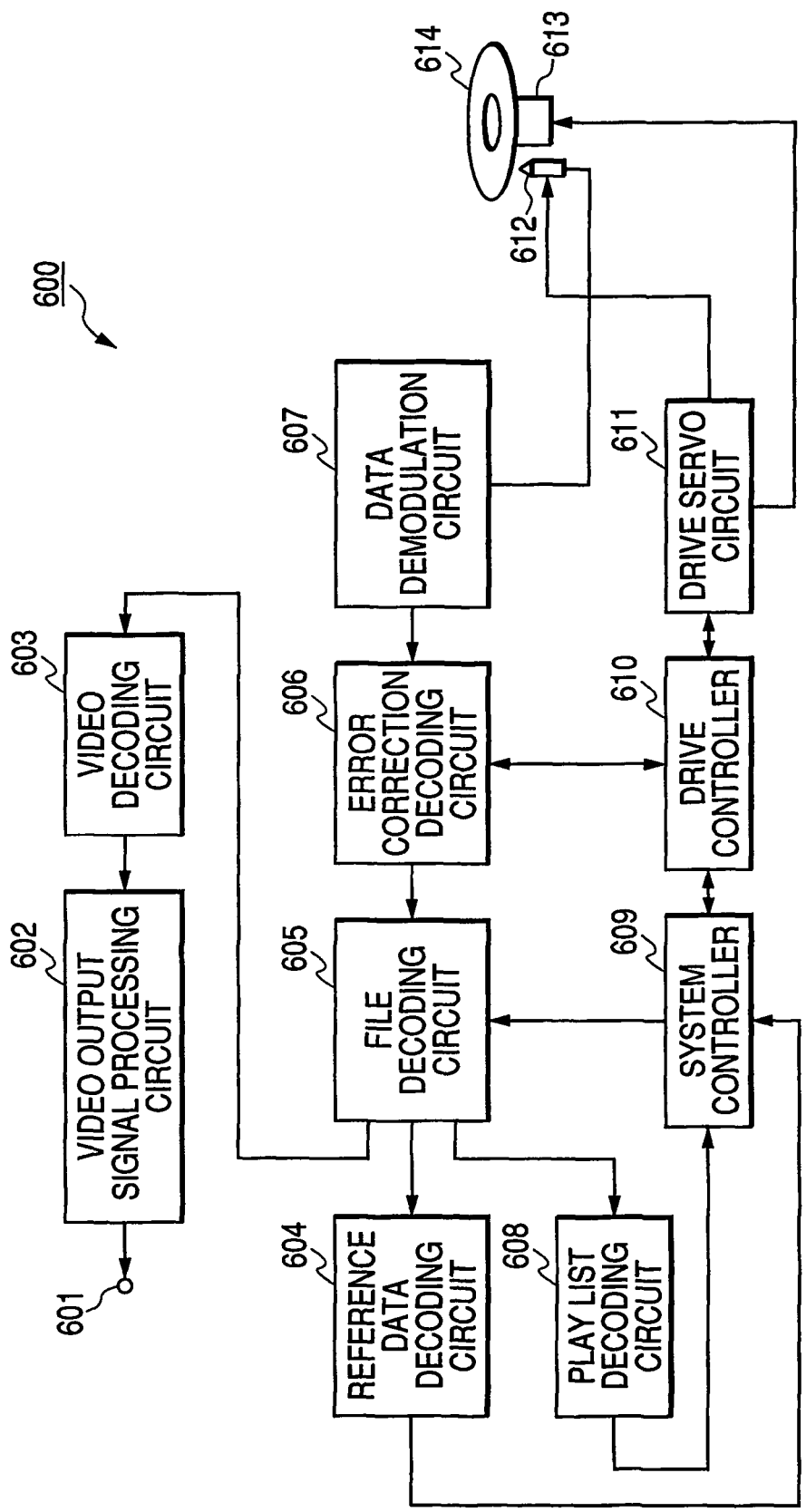
FIG. 6 is a view showing the configuration of play list reproduction of the video camera apparatus which is of one embodiment of the recording and reproducing apparatus of the invention.
Figure 8:
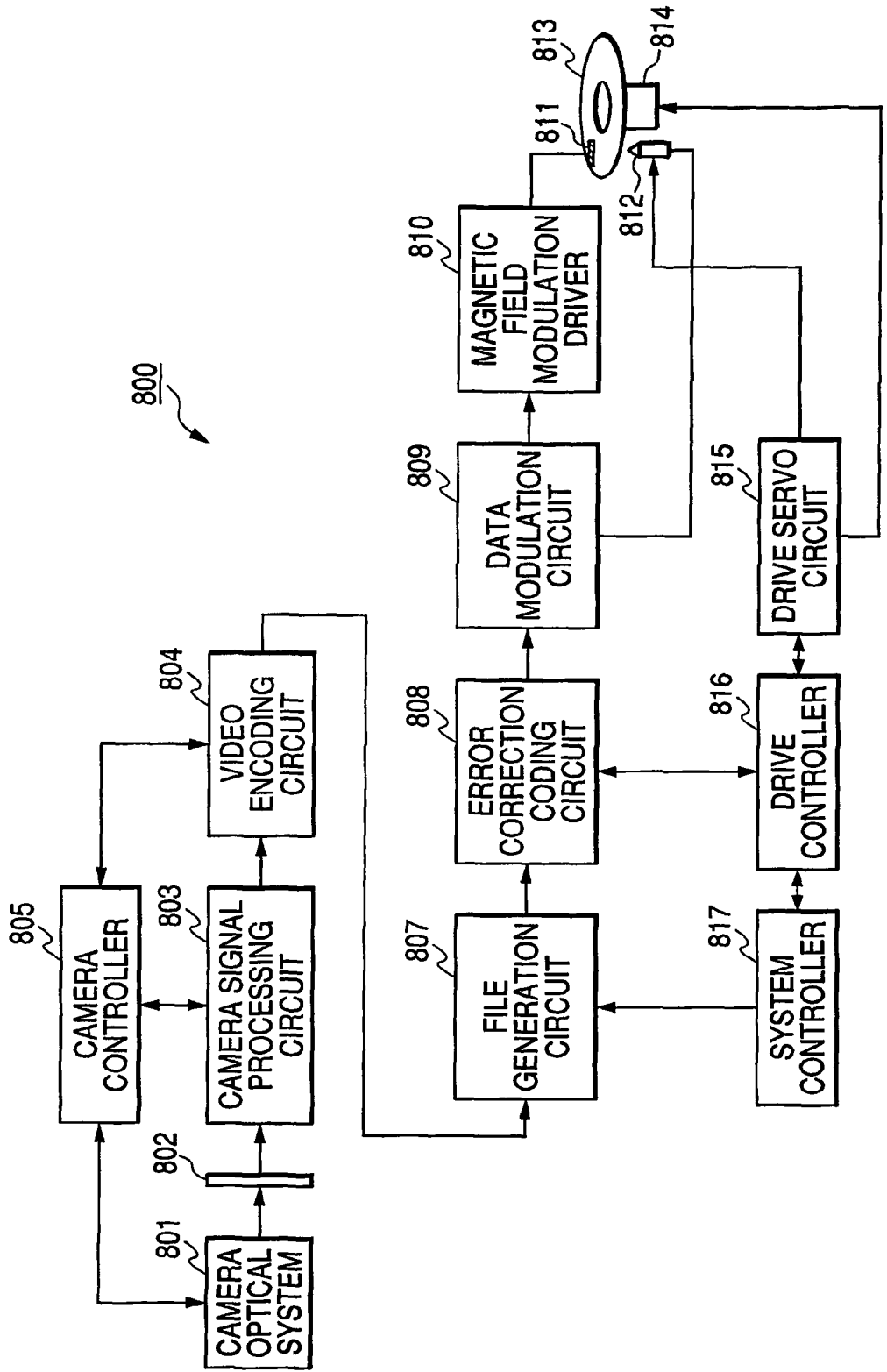
FIG. 8 is an example of the configuration of the conventional video camera.

FIG. 6 is the view showing the configuration of a video camera apparatus 600 which is of an example of the recording and reproducing apparatus in which the disk is mainly used as the recording medium, and the configuration shown in FIG. 6 corresponds to that used for the reproduction in which the above-described play list is used. It is possible that the video camera apparatus 600 is integrated with the above-described video camera apparatuses 100, 200, and 500 on the product. The video camera apparatus 600 also has all the above-described functions and configurations. Namely, the video camera apparatus 600 has the configuration including the reproducing function which can be operational to the normal reproduction by the above-described QuickTime format and the play list reproduction by the play list format using the reference type data. By the concurrent use of the QuickTime format and the play list format, the editing function by the play list can be expanded and more flexible editing can be attained rather than the single use of the QuickTime format or the play list format.

In FIG. 6, a drive controller 610 controls the data readout of the overall drive by inputting the control signal to a drive servo circuit 611 on a request from a system controller 609 to control an optical pickup 612 and a motor 613. A recording medium 614 is the disk-shaped recording medium, and the recording medium 614 includes DVD, Blu-ray, and the like.

At first, the optical pickup 612 reads out the management data recorded on the recording medium 614. On the data read out from the recording medium 614 by the optical pickup 612, the demodulation processing is performed by a data demodulation circuit 607, and the error generated due to defect of the recording medium 614 or during the recording processing and reproducing processing is corrected by an error correction decoding circuit 606. A file decoding circuit 605 decodes the logical file format from the data string after the error correction.

In play list reproducing operation, the play list file recorded on the recording medium 614 is read out according to the logical file format. On the data read out, the demodulation processing is performed by the data demodulation circuit 607, and the error correction is performed by the error correction decoding circuit 606. The data is decoded into the play list data by the file decoding circuit 605, and then the reproduction description data by SMIL is decoded in a play list decoding circuit 608.

When the desired play list file is selected by the user, in accordance with the information concerning the reference relation corresponding to the decoded reproduction description data, the related reference type moving image file (QuickTime file) is read out from the recording medium 614 by the instruction of the system controller 609.

On the reference type moving image file (QuickTime file) read out, the demodulation processing is performed by the data demodulation circuit 607, and the error correction is performed by the error correction decoding circuit 606. The data is decoded into the reference type moving image data by QuickTime with the file decoding circuit 605, and then the reference relation of QuickTime is decoded in a reference data decoding circuit 604. The data contents to be actually reproduced are read out from the recording medium 614 by the instruction of the system controller 609 according to the decoded reference relation of QuickTime.

On the data contents read out, the demodulation processing is performed by the data demodulation circuit 607, and the error correction is performed by the error correction decoding circuit 606. Then, the data contents are decoded into the digital video data (MPEG-2 data) by the file decoding circuit 605, and the expansion decoding processing of the data contents is performed according to the MPEG-2 format by a video decoding circuit 603. The decoded digital video data is converted into the analog or digital video signal by a video output signal processing circuit 602 and output from a terminal 601 to the monitor (not shown), the external recording apparatus, or the like. Up to this point, the video camera apparatus 600 of FIG. 6 is described.

In video camera apparatus 600 of FIG. 6, one or the plurality of the reference type moving image data such as QuickTime and/or the plurality of data contents is configured so as to be referred to by the reference type moving image data such as the play list in which the time synchronization can be attained between the data contents.

As described above, according to the configuration of the recording and reproducing apparatus in the embodiment, more flexible editing function can be realized by also using the reference type data, such as QuickTime or the play list, which has no direct relation with the format of the recording medium and is of the file-level reference.

Other Embodiments

Note that the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a Blu-ray DISC, and a DVD (a DVD-ROM, a DVD-R, a DVD-RW and a DVD-RAM).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

The invention claimed is:

1. A video camera apparatus including an image pickup device for capturing an image, said apparatus comprising:
   a content recording unit configured to record, on a recording medium, video data content including a motion image captured by the image pickup device;
   a first file generation unit configured to generate reference type movie data corresponding to the recorded video data content in accordance with a first file format concurrently with capturing the motion image by the image pickup device, by describing, in the generated reference type movie data, reference information of the corresponding video data content including the motion image recorded on the recording medium by the content recording unit;
   a first recording unit configured to record the reference type movie data on the recording medium as a file;
   an editing instruction unit configured to instruct to edit the motion image included in the video data content recorded on the recording medium;
   a second file generation unit configured to generate playlist data according to a second file format different from the first file format so as to describe, in the playlist data, the reference type movie data describing therein the reference information of the video data content corresponding to the motion image to be edited in accordance with an instruction by the editing instruction unit, thereby providing an editing result corresponding to the instruction by the editing instruction unit as the reference type movie data described in the playlist without editing the motion image itself included in the video data content recorded on the recording medium; and
   a second recording unit configured to record the playlist data on the recording medium as a file for reproducing the motion image corresponding to the instruction by the editing instruction unit.

2. An apparatus according to claim 1, wherein an editing process instructed by the editing instruction unit is at least one of editing processes of division, combination, and partial deletion of the motion image included in the video data content recorded on the recording medium.

3. An apparatus according to claim 1, wherein the reference type movie data includes (a) a first data structure which has a first time coordinate system and directly refers to the recorded motion image recorded on the recording medium, and (b) a second data structure which has a second time coordinate system independent of the first time coordinate system and which indirectly refers to the motion image included in the video data content recorded on the recording medium, by referring to the first data structure.

4. An apparatus according to claim 3, wherein the reference type movie data is of QuickTime format or an expansion format of QuickTime.

5. An apparatus according to claim 1, wherein the playlist data describes a reproducing mode of the motion image included in the video data content recorded on the recording medium.

6. An apparatus according to claim 5, wherein the playlist data is of SMIL format or an expansion format of SMIL.

7. An apparatus according to claim 1, further comprising a reproducing unit configured to reproduce the motion image included in the video data content recorded on the recording medium,
   wherein the reproducing unit is arranged to reproduce a respective motion image included in the video data content recorded on the recording medium, according to the reference type movie data and the playlist data.

8. An apparatus according to claim 1, wherein the reference type movie data comprises Quicktime format data.

9. A control method of a video camera apparatus for recording video data captured by an image pickup device on a recording medium, said method comprising:
   a content recording step of recording, on a recording medium, video data content including a motion image captured by the image pickup device;
   a first file generation step of generating reference type movie data corresponding to the recorded video data content in accordance with a first file format concurrently with capturing the motion image by the image pickup device, by describing, in the generated reference type movie data, reference information of the corresponding video data content including the motion image recorded on the recording medium by the content recording unit;
   a first recording step of recording the reference type movie data on the recording medium as a file;
   an editing instruction step of instructing to edit the motion image included in the video data content recorded on the recording medium;
   a second file generation step of generating playlist data according to a second file format different from the first file format so as to describe, in the playlist data, the reference type movie data describing therein the reference information of the video data content corresponding to the motion image to be edited in accordance with an instruction in the editing instruction step, thereby providing an editing result corresponding to the instruction in the editing instruction step as the reference type movie data described in the playlist without editing the motion image itself included in the video data content recorded on the recording medium; and a second recording step of recording the playlist data on the recording medium as a file for reproducing the motion image corresponding to the instruction in the editing instruction step.

\* \* \* \* \*